Nov. 13, 1928.

G. VON ARCO ET AL 1,691,618

SPEED INDICATOR AND REGULATOR FOR ELECTRIC MOTORS

Filed Jan. 16, 1925

INVENTOR
GEORG VON ARCO, WALTER SCHAFFER
AND WILHELM MOSER
BY
ATTORNEY

Patented Nov. 13, 1928.

1,691,618

UNITED STATES PATENT OFFICE.

GEORG VON ARCO, WALTER SCHAFFER, AND WILHELM MOSER, OF BERLIN, GERMANY, ASSIGNORS TO GESELLSCHAFT FÜR DRAHTLOSE TELEGRAPHIE M. B. H., OF BERLIN, GERMANY, A CORPORATION OF GERMANY.

SPEED INDICATOR AND REGULATOR FOR ELECTRIC MOTORS.

Application filed January 16, 1925, Serial No. 2,778, and in Germany January 28, 1924.

Our invention relates to devices for indicating and governing the speed of prime movers in general, and in particular electric motors.

It has for one of its objects to provide such a device that will be independent of the voltage of the auxiliary source of energy required to operate the device.

A further object is to provide such a device that can be adjusted for any desired speed within certain limits while the electric motor is in use.

Other objects will be apparent from the following description and claims when considered with the accompanying drawings in which:—

Figure 1:
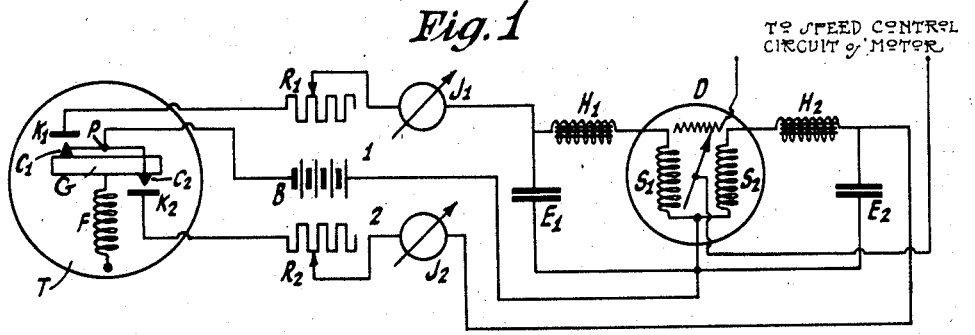
Figure 2:
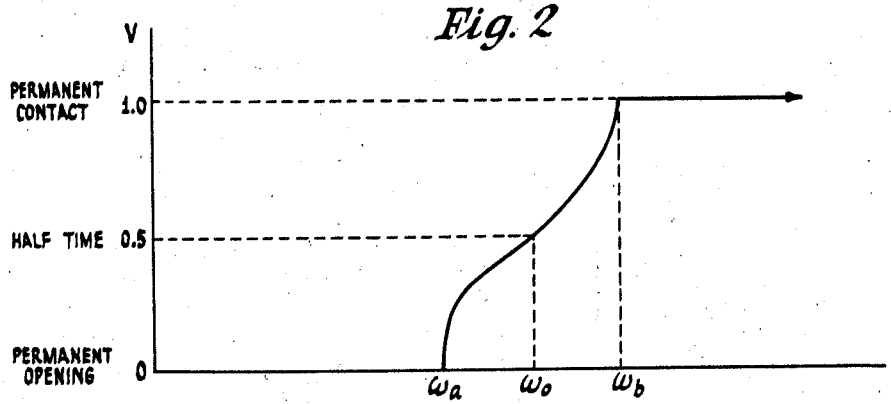
Figure 3:
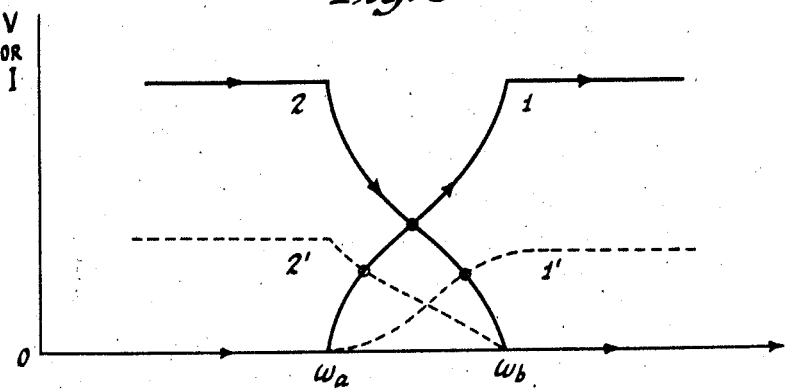

Fig. 1 is a schematic diagram of our indicating and regulating arrangement and Figs. 2 and 3 are curves indicating the theory of operation of the arrangement.

Speed regulators for electric motors are known which operate on the principle of the centrifugal governor. A usual type of construction is as follows:

A mass is under the influence of the force of a spring and of the centrifugal moment of inertia. One end of the spring is fixed to a turn-disc which is compelled to rotate with the machine whose speed it is desired to govern. On the other end of the spring is the mass. At a certain speed of rotation $\varpi = \varpi_0$ the spring is so put under tension that the mass effects a contact between a contact point on it and on the turn-discs. A regulating current then flows across these contact points. At a horizontal position of the axis of rotation, as assumed for the following, the motion of the mass is also influenced by the force of gravity, alternately in a centripetal and centrifugal direction. Consequently the weight oscillates in a radial direction, and the contact is pulsatingly effected within a small range near $\varpi_0$, say from $\varpi_a$ across $\varpi_0$ to $\varpi_b$.

At $\varpi = \varpi_a$ the contact is effected for one point only of the space of rotation. The contact time then increases with increasing $\varpi$. At $\varpi = \varpi_0$ closed contact time and open contact time are equal to one another, and at $\varpi = \varpi_b$ a permanent contact is attained. The range from $\varpi_a$ to $\varpi_b$ is the regulating range. If the ratio $v$ of closed contact time to the time of rotation is drawn as a function of $\varpi$, we obtain a contact curve as shown in Figure 2.

Such a speed regulator can also be used as a sensitive speed indicator. If a constant auxiliary voltage together with a suitable series connected resistance be applied to the contact points of the speed regulator and if the current flowing through the contact points be measured, the intensity of current is a measure of the speed of the motor. This speed indication is restricted to the range of regulation, but it is very sensitive within this range, if the speed regulator itself is sensitive. The principle of operation may easily be seen from the diagram of Fig. 2. $v$ also determines the current I flowing through the contact according to the equation:

$$I = v \cdot I_k$$

where $I_k$ denotes the current flowing at permanent closed contact. When $I_k$ is known and when the contact current is measured, the diagram of Fig. 2 gives the speed directly. It may be appropriate to calibrate the ammeter directly for speeds.

The disadvantages of the arrangement are that the accuracy of indicating depends on the constancy of the applied auxiliary voltage and on the breadth of regulation of the speed regulator. Furthermore another adjustment of the indicating point or regulating point is only possible by a mechanical alteration of the regulator, and this alteration can only be carried out with certainty when the machine is stopped.

These disadvantages are overcome by the present invention which makes the speed indication independent of the applied auxiliary voltage, at least for a certain speed. According to the invention the accuracy of the indication can at will be raised to any degree irrespective of the breadth of regulation. Finally this invention enables the regulating point to be also adjusted otherwise, in an electrical way while the machine is working. According to the invention this is attained by arranging two contacts on one or two equal centrifugal governors in opposite senses, and having them act upon two separate circuits which are connected in differential connection and which act upon the same indicator or relay. The equality of the currents of the two circuits is the condition for the indicating point or regulating point.

The idea of the invention may be more fully explained by referring to Fig. 1. T is a turn-disc mounted to rotate with the electric motor or other prime mover (not shown) whose speed it is desired to regulate. F is the spring one end of which is fixed to turn disc T and to whose other end is fixed the weight G. The latter bears the contact point $C_2$ on its inner side and on the outer side the contact point $C_1$. The common pole P of these two contacts is connected across a slip-ring (not shown) and across the battery B to the common end of the two differential windings $S_1$ and $S_2$ of the indicator or relay D. From the other ends of the differential windings $S_1$ and $S_2$ the paths of current lead back thru slip-rings (not shown) to contact points $K_1$ and $K_2$ mounted directly on the turn-disc T, contact point $K_1$ cooperating with $C_1$ and contact point $K_2$ with $C_2$. The contact points are so adjusted that their ranges of regulation coincide with one another.

If the speed of rotation is smaller than the regulating speed, contacts $C_1$ and $K_1$ are opened and $C_2$ and $K_2$ are closed. The indicator or relay D deflects in one direction. Within the range of regulation the indicator keeps about the zero point, and at higher speeds it deflects in the other direction. The zero adjustment corresponds to the equality of the currents $I_1$ and $I_2$ in the two regulating circuits 1 and 2. The absolute value of these currents has however no influence on the zero position.

Therefore the indicator is independent of voltage variations of the battery B; but the sensitiveness of indicating is increased by an increase of the voltage of the battery. As a pulsating direct current flows through the instrument D, the voltage of B cannot be increased at will, as the single pulsations can endanger the instrument even in the zero position. In order to diminish these pulses of current, two condensers $E_1$ and $E_2$ which are connected in parallel to windings $S_1$ and $S_2$ and two choke coils $H_1$ and $H_2$ are employed according to the invention.

If D is a differential relay which regulates the electric motor by means of a special regulating circuit (not shown) acting upon the speed regulator which is combined with the motor, this relay adjusts the speed to a value which corresponds to the equality of the currents $I_1$ and $I_2$. In other words the pointer of differential relay D always acts upon the auxiliary motor controlling circuits in such a way that the speed of the motor is changed so that the pointer goes back to zero position. In order that the pointer be in zero position equal effective currents must be flowing in the differential windings $S_1$ and $S_2$. This gives the possibility of altering the regulating speed by a certain amount by means of the resistances $R_1$ and $R_2$ which are arranged in the contact circuits.

If $\varpi_0$ is the regulating speed for the case $R_1 = R_2$, the regulating speed is greater than $\varpi_0$ for $R_1 > R_2$ and smaller than $\varpi_0$ for $R_1 < R_2$. This can easily be seen from Fig. 3 which shows the contact curves of the two contacts. The rising curve 1 corresponds to contact points $C_1$ and $K_1$ and the drooping curve 2 to contact points $C_2$ and $K_2$. The currents flowing through the contacts denote the ordinates of this drawing. The point of intersection of the two curves then is the regulated speed. The two curves 1 and 2 correspond to the condition $R_1 = R_2$ for which both curves are symmetrical. If $R_1$ is increased, curve 1 is correspondingly lowered as $I_1$ becomes smaller. We obtain the dotted curve 1' and the point of intersection, that is, the regulation speed, moves upward. The reverse takes place, if $R_2$ is greater than $R_1$. We obtain the dotted curve 2', for which the point of intersection, that is the regulating speed, lies lower. It is important in principle that in this way the point of regulation can be adjusted while the motor runs.

Having described our invention, we are entitled to all modifications thereof as fall fairly within the spirit and scope of the following claims:

1. A speed regulator comprising a rotating element, a centrifugally affected mass mounted thereon, a spring for resiliently supporting said mass on said element, contacts mounted upon said mass and adapted to be alternately closed by radial movement of said mass, a differential relay connected thereto, and current controlling means actuated by said relay.

2. In a speed regulator, a centrifugal device, a plurality of pairs of alternately actuated contacts controlled thereby, a differential relay responsive to the time of closing thereof, and energy input controlling means actuated by said relay.

3. In a speed regulating device, a centrifugally responsive vibratory member, a plurality of pairs of contacts operated thereby, a differential relay responsive thereto, and means comprising resistances inserted in circuit between said contacts and said differential relay for varying the response of said relay.

4. In a speed regulated device, a centrifugally affected mass having contacts adapted to be closed alternately by movements thereof in opposite directions whereby successive pulses of current varying in duration according to the departure of speed from the regulated value are impressed on the respective circuits, means comprising a differential relay connected thereto and adapted to maintain a neutral position when said pulses are of equal value and to move according as impulses from one or the other pairs of contacts increase in length, and means comprising resistances to adjust the ratio of the values of said pulses at which said relay maintains a neutral position to values other than unity.

GEORG von ARCO.
WALTER SCHAFFER.
Dr. WILHELM MOSER.